UNITED STATES PATENT OFFICE.

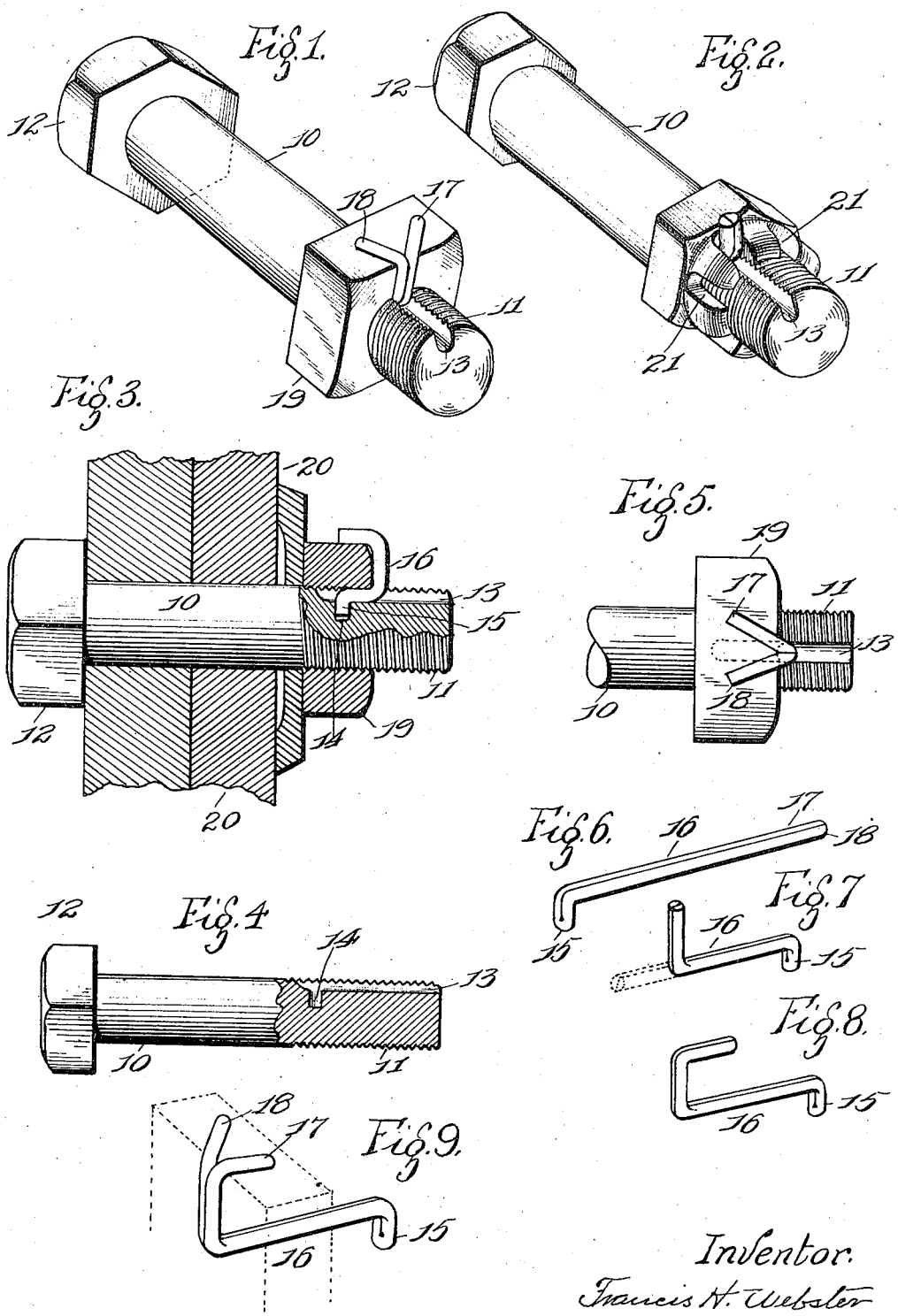

FRANCIS H. WEBSTER, OF ST. LOUIS, MISSOURI.

NUT-LOCK.

1,310,723.　　　　Specification of Letters Patent.　　Patented July 22, 1919.

Application filed February 13, 1919.　Serial No. 276,772.

*To all whom it may concern:*

Be it known that I, FRANCIS H. WEBSTER, a citizen of the United States, and resident of St. Louis, Missouri, have invented certain new and useful Improvements in Nut-Locks, of which the following is a specification.

This invention relates to improvements in nut locks, and has for its object a bolt with a channel of a suitable depth formed in the threaded portion of the bolt and a depression of a greater depth formed in the channel in which is inserted the head or bent end of a cotter-pin, wire, nail, or other suitable device and which is arranged to be bent-up and spread over the nut which is placed over the threaded portion and tightened against the object which the bolt is to support.

A further object of my invention is to construct a bolt, the shank of which is to be free and un-obstructed so that said shank may act as a proper pivot when used in connection with moving parts, the threaded portion of said bolt provided with a suitable channel in which is inserted a means that is supported in position when the nut is applied and to be bent up against the surface of the nut to prevent said nut from becoming unscrewed by the continuous vibration brought on the bolt.

The general arrangement is to use this means for ordinary square, hexagon, or other shaped nuts as well as to use it in connection with the present cotter-pin nut which has a portion of its surface equipped with a plurality of slots or cavities through which cotter-pins are inserted which extend through the entire bolt but which is devoid in my construction as with my arrangement the nut on the bolt can be adjusted to the article to which it is to be attached without the necessity of selecting several lengths of bolts, the cavity or channel in the threaded portion of the bolt is so arranged that the locking pin is supported in its position by the nut as well as the nut prevented from turning when the pin is suitably bent up or in position over the edge of the nut as shown in the illustration.

Figure 1, is a perspective view of complete invention showing the same in use with a square nut.

Fig. 2, is a perspective view of my invention showing it in application with a cotter-pin nut.

Fig. 3, is a vertical sectional view showing the application of my invention to the bolt and nut.

Fig. 4, is a combination side and sectional view of the bolt showing the channel and depression.

Fig. 5, is a top plan view of a nut and a portion of the bolt showing the position of the locking pin when bent over the nut.

Fig. 6, is a detail perspective view of the locking pin made use of.

Fig. 7, is a perspective view of the same showing its end bent up at right angles.

Fig. 8, is a perspective view of the same with its end bent up at double right angles.

Fig. 9, is a detail perspective view of the locking pin showing the bent ends spread out against the flat surface of a square nut.

In describing my invention in detail 10 indicates an ordinary bolt having a screw-threaded portion 11, and a head 12, the head of course may be of the ordinary type such as square, hexagon, or octagon, the shank portion of the bolt being perfectly smooth and un-obstructive and in the screw-threaded portion 11, I provide a channel 13 which extends approximately the length of the threaded portion and in the channel and extending into the bolt is a bore or depression 14 which is of a size and shape sufficient to accommodate the insertion of the head 15 of the locking pin 16.

The locking pin 16 is preferably constructed of a cotter-pin type that is by splitting the pin so as to form it of two sections 17 and 18, and the purpose of this is that when the pin is inserted in position in the channel and the nut 19 applied on the threaded portion and tightened against the object 20, then the pin can be bent up against the bolt surface of the nut 19 and again bent over the top of the nut assuming a position as that shown in Figs. 1 and 3, and if found desirable, the sections 17 and 18 of the pin may be spread apart in a position as that shown in Figs. 1, 5, and 9, thereby giving a greater supporting surface so as to prevent the nut from turning.

The position of the bore 14 is such that the nut when applied on the threaded portion will conceal the same and firmly hold the pin in position but on the other hand if it becomes necessary to insert the bolt through an object of greater width so that the nut when applied to the bolt will just cover the end of the threaded portion, then the object through which the bolt is inserted will support the head 15 and the pin in position and the end of the pin permitted to be bent up against the surface of the nut.

In instances where a nut of the cotter-pin type such as that shown in Fig. 2 is used and where its front surface is provided with a plurality of slots 21, the pin when used in instances where such nuts are applied is bent up into the slots 21 in a position as shown in Fig. 2. This will then prevent such type of nut from turning and becoming lost from the bolt.

The device is a simple one yet it has novelty and merit, as well as utility which none of the bolts of somewhat similar construction acquire. Most of the bolts which are provided with a channel and a pin are so arranged as to run into the shank of the bolt and will have to be driven in after the nut is applied such as wedge fashion and when the pin is driven in position after the bolt has been placed in the object there is no way of gaining access to drive the end of the pin into the vertical depression.

Wherever an instance presents itself where the bolt of my construction requires a portion of the threaded section to enter the material, the pin as shaped in Fig. 6 is inserted in the cavity, then the bolt together with the pin inserted through the object and the nut applied and when so properly tightened the end of the pin is then bent up in a fashion as that shown in the illustration.

I may, if desired use a solid pin instead of the split cotter fashion, it may be in the form of a wire or a nail, the head of the nail acting as a head pin and where a wire is used the end is merely bent over so as to fit in the bore 14. This pin is of such material as to be rigid enough to properly support the nut when thoroughly turned yet when it is desired to remove the nut for repair purposes the pin can be bent down and the nut taken off.

Having fully described my invention what I claim is:

A nut lock comprising a bolt the threaded portion of said bolt provided with a channel running parallel with the bolt and extending approximately the full length of the threads, a split locking pin provided with a head bent at right angles and adapted to be inserted in the channel of the bolt and its free ends bent up and over the nut, said ends being spread apart when in its bent position, substantially as specified.

In testimony whereof I have signed my name to this specification in presence of two subscribing witnesses.

FRANCIS H. WEBSTER.

Witnesses:
 ALFRED A. EICKS,
 B. M. AUSTINE.